(12) United States Patent
Tanaka (10) Patent No.: US 6,289,427 B1
(45) Date of Patent: Sep. 11, 2001

(54) CONTROLLING A READ ADDRESS OR A WRITE ADDRESS BASED ON THE QUANTITY OF DATA READ FROM OR WRITTEN INTO A MEMORY

(75) Inventor: Yasuyuki Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/150,838

(22) Filed: Sep. 10, 1998

(30) Foreign Application Priority Data

Sep. 12, 1997 (JP) .................................................. 9-248515

(51) Int. Cl.[7] .................................................. G06F 12/02
(52) U.S. Cl. .............................. 711/201; 710/34; 711/154; 711/171
(58) Field of Search ....................................... 709/234, 245; 710/29, 34, 52, 53, 55, 56, 57; 711/1, 218, 219, 220, 154, 171, 201; 386/91

(56) References Cited

U.S. PATENT DOCUMENTS

| | | | |
|---|---|---|---|
| 5,712,946 | * 1/1998 | Yanagihara et al. | 386/68 |
| 5,819,113 | * 10/1998 | Singh et al. | 710/55 |
| 5,845,152 | * 12/1998 | Anderson et al. | 710/52 |
| 5,860,119 | * 1/1999 | Dockser | 711/156 |
| 5,960,468 | * 9/1999 | Paluch | 711/219 |
| 6,034,732 | * 3/2000 | Hirota et al. | 348/441 |

* cited by examiner

Primary Examiner—Hiep T. Nguyen
Assistant Examiner—Gary J. Portka
(74) Attorney, Agent, or Firm—Fitzpatrick, Cella, Harper & Scinto (57) ABSTRACT

Even if the timing of reading or writing the data of a predetermined quantity deviates, missing data can be minimized. The data quantity read from memory which stores the predetermined numbers of the fixed-length data is detected, the data quantity detected is compared with a predetermined value, and a reading address of the memory is controlled in accordance with the comparison result. Also, the data quantity written into the memory which stores the predetermined numbers of the fixed-length data is detected, the data quantity detected is compared with a predetermined value, and a writing address of the memory is controlled in accordance with the comparison result.

39 Claims, 10 Drawing Sheets

CONTROLLING A READ ADDRESS OR A WRITE ADDRESS BASED ON THE QUANTITY OF DATA READ FROM OR WRITTEN INTO A MEMORY

BACKGROUND OF THE INVENTION

1. Field of the Invention

The present invention relates to an apparatus and a method for controlling a memory, and a program included in a medium readable by a computer, and more particularly, to a technology for controlling the reading to, and writing from, a memory.

2. Description of the Related Art

Recently, with the progress of digital techniques, an apparatus has been developed for transmitting a large amount of digital data (e.g., dynamic image data) with a relatively low rate to a recording medium and the like by reducing the amount of data by compressing/encoding them.

As an apparatus of this kind, the most recently, a format of a digital VTR which records/reproduces the digitized video signals for a magnetic tape has been standardized, according to the HD public welfare digital VCR council.

In the digital VTR based on this standard, the input video signal is compressed/encoded by using DCT techniques, quantization, and variable-length encoding. The amount of information thereof is thereby compressed from about 125 Mbps into about 25 Mbps. Through a memory, the detection/correction codes (e.g., the Reed-Solomon iterated (product) code) for use in error detection/correction are added to the video signals which are compressed as described above, and recorded into the magnetic tape in a predetermined data format.

Furthermore, the video signals which are generated in accordance with the standard might be packetized for each data block in a predetermined unit, and transmitted to an external recording device and the like through a high speed digital interface.

However, when recording/reproducing the digital video signals which are compressed/encoded according to the digital VTR in real time, or when transmitting/receiving them from an external device (e.g., other digital VTR) in real time, usually, a memory for temporarily storing the video signals of predetermined units is required.

For example, when transmitting the digital video signals which are generated at the digital VTR in real time to an outside device through a transmission line having a speed different from that of the signals, because the digital video signal to be transmitted is matched with the transmission speed of the transmission line, on a transmission side, it is necessary to temporarily hold them in the memory. Then, the transmission side reads and outputs the digital video signals which are held in the memory one by one, per data for one packet by matching the transmission speed of the transmission line.

Also, similarly, when receiving the packets transmitted from an outside device one after another, it is necessary to temporarily hold the data of the respective packets in order to return the speed of the data of the respective packets received to the speed of the original digital video signals.

When reading the data being held in the memory per data of one packet, or when writing them into the memory per data of one packet, there exist the following problems.

For example, when the timings for reading the data per one packet from the memory have deviated, there was a case that all of the data of that packet could not be read. As a result, since the rest of data which remained in the memory is read together with the data which is to be read at the next data read time period, the data might have not the proper arrangement.

Furthermore, when the timings for writing the data per one packet from the memory have deviated, there was a case that all of the data of that packet could not be written. As a result, since a portion of the data is written together with the data which is to be written into the memory at the next data write time, that written data might have not the proper arrangement.

SUMMARY OF THE INVENTION

An object of the present invention is to solve the above-mentioned problems.

Another object of the present invention is to implement a process of holding an absence of the data at minimum, even when the timings for reading or writing the data have deviated, in the apparatus and method for controlling a memory, and in the program for controlling a memory, which is stored in a medium readable by a computer.

One preferred embodiment of the present invention is directed to a memory control device including, means for detecting a quantity of data written into a memory or a quantity of a data read from the memory, means for comparing the detected quantity of data with a predetermined value, and means for controlling a writing position or a reading position of the memory in accordance with the comparison result.

Further, another embodiment of the present invention is directed to a memory control method including, detecting a quantity of data written into a memory or a quantity of data read from the memory, comparing the detected data quantity with a predetermined value, and controlling the writing position or the reading position of the memory based on the comparison result.

Another embodiment of the present invention is directed to a computer-readable storage medium containing a program for controlling a memory which, when executed, causes to be performed a method, including the steps of detecting a quantity of data written into a memory or a quantity of data read from the memory, comparing the detected data quantity with a predetermined value, and controlling the writing position or the reading position of the memory based on the comparison result.

Another object of the present invention is to implement a process of minimizing a lack of data when the timing for writing the data has deviated, in the receiver, its corresponding method, and in a computer-readable storage medium containing a program for controlling the receiving process.

The preferred embodiment for the present invention is also directed to the receiver including means for receiving a plurality of packets transmitted at a predetermined communication cycle, a memory for writing data included in a received packet, means for evaluating a quantity of data written into the memory, and means for controlling the writing position of the memory based on the evaluation result.

Another embodiment of the present invention is directed to a receiving method including the steps of receiving a plurality of packets to be transmitted at a predetermined communication cycle, writing data included in a received packet into memory, evaluating a quantity of the data written into memory, and controlling the writing position of the memory based on the evaluation result.

Another embodiment of the present invention is directed to a computer-readable storage medium containing a program for controlling a receiving process which, when executed, causes a method to be performed, including the step of receiving a plurality of packets transmitted at a predetermined communication cycle, writing the data included in the received packet into memory, evaluating a quantity of the data written into memory, and controlling the writing position of the memory based on the evaluation result.

Another object of the present invention is to implement a process of minimizing a lack of data when the timing for reading the transmission data has deviated, in the transmitter, its corresponding method, and computer-readable storage medium containing a program for controlling the transmitting process.

The preferred embodiment for the present invention is also directed to such objects, a transmitter, including, a memory capable of storing a predetermined quantity of data, means for generating a packet from the data read from memory, and for transmitting the packet at a predetermined communication cycle, means for evaluating a quantity of the data read from memory, and means for controlling a reading position of said memory based on the evaluation results.

Another embodiment of the present invention is directed to a transmitting method including the steps of storing a predetermined quantity of data in memory, generating a packet from a data read from memory, and transmitting the packet at a predetermined communication cycle, evaluating a quantity of the data read from memory, and controlling the reading position of the memory based on the evaluation results.

Another embodiment of the present invention is directed to a computer-readable storage medium containing a program for a transmitting process which, when executed, causes a method to be performed, including the steps of storing a predetermined quantity of data in memory, generating a packet from data read from memory, and transmitting the packet at a predetermined communication cycle, evaluating a quantity of the data read from memory, and controlling the reading position of the memory based on the evaluation results.

Other objects of the present invention, and the advantages thereof, will become fully apparent from the following detailed description of the embodiments.

DESCRIPTION OF THE PREFERRED EMBODIMENTS

The preferred embodiments of the present invention will be described in detail with reference to the accompanying drawings hereinafter.

First Embodiment

Figure 1:
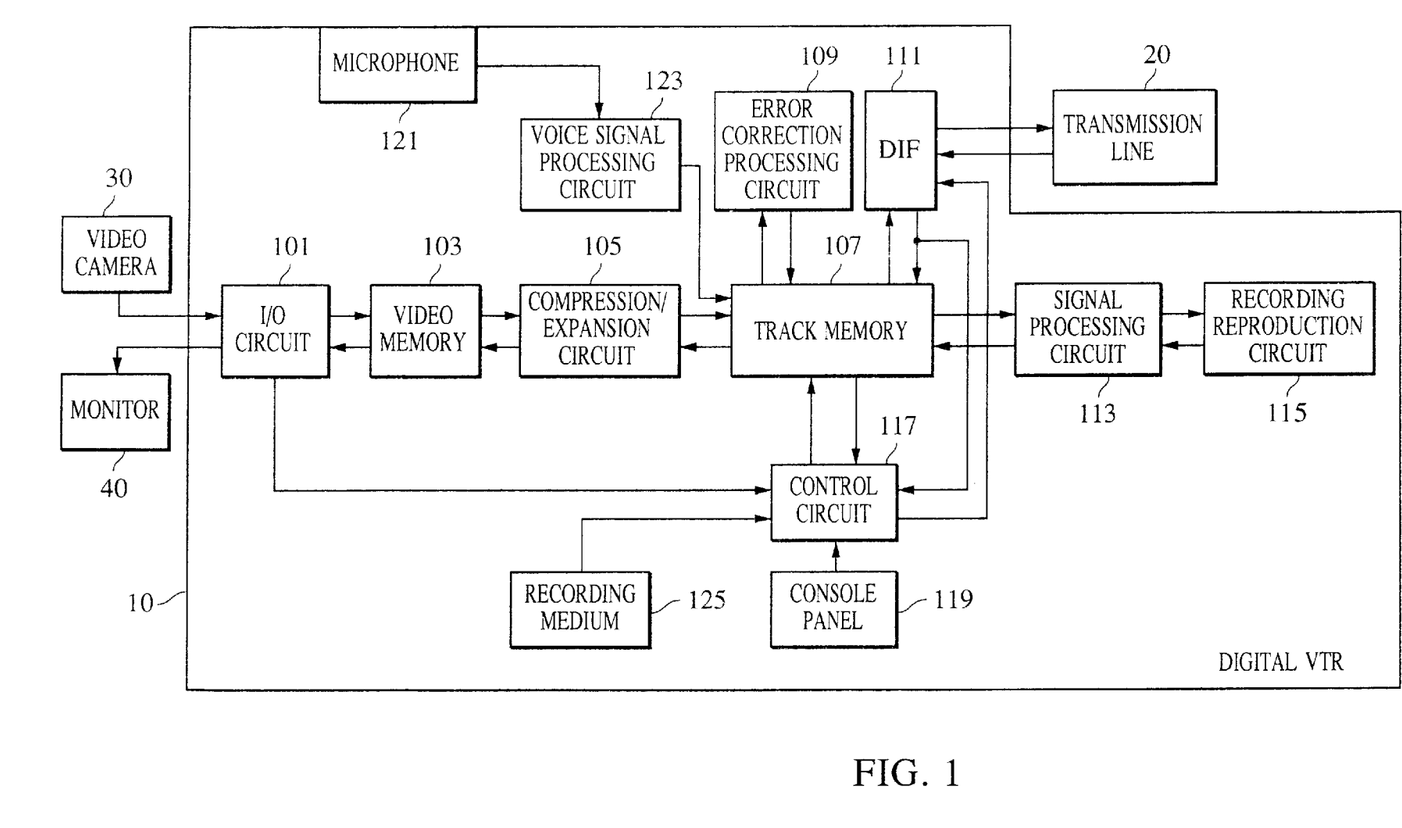
FIG. 1 is a block diagram showing a configuration of a digital VTR 10 in one embodiment of the present invention.

FIG. 1 is a block diagram showing a configuration of the digital VTR in the present embodiment.

In FIG. 1, 10 refers to the digital VTR, and 20 refers to the transmission line which is adapted to transmit the digitized video signals, the audio signals, and the control signals in a time-sharing manner in and out of the VTR, and is configured with a serial-bus, for example. 30 refers to the video camera which generates predetermined image-pickup signals from optical images of a subject (for photography), and converts the image-pickup signals to video signals and then outputs the video signals, and 40 refers to the monitor which displays images of such video signals output from the digital VTR 10.

The recording/reproducing operations in the digital VTR 10 will be described hereinafter.

In FIG. 1, when a user issues a "recording" instruction by using the console panel 119, the video signals output from the external devices such as the video camera 30 and the like are input to the I/O (Input/Output) circuit 101. The I/O circuit 101 converts the input video signals to digital signals and outputs them to the video memory 103 by performing the filtering process and the like thereon.

The video memory 103 is capable of storing the uncompressed video signals of the multiple frames (2 frames in the present embodiment), and outputs (i.e., shuffling) the stored video signals by reading them in the order suitable for the processes in the compression/expansion circuit 105 at the latter part. The compression/expansion circuit 105 compresses the amount of information of the video signals by using DCT techniques, quantization, and variable-length encoding, and encodes them, and supplies them to the track memory 107 in such a manner that they can be read in the order of the original input video signals.

The track memory 107 is a memory which is capable of storing the compressed video signals, the audio signals and other additional signals of the multiple frames (3 frames in the present embodiment). Herein, the track memory 107 in the present embodiment is a three-bank structure. The track memory 107 switches these three banks in synchronization with the input video signals one after another, and stores the video signals of one frame in one bank.

Further, in each bank of the track memory 107, in addition to the video signals of one frame, the audio signals, and other additional signals (e.g., a sub-code data, a video AUX data and the like) can be recorded. Herein, the audio signals of the present embodiment are generated by collecting the sound with the microphone 121 and by implementing a predetermined signal processing in the voice signal processing circuit 123. Also, the additional signals of the present embodiment are generated in the control circuit 117.

The error correction processing circuit 109 accesses the track memory 107 and implements an error correction encoding process for the video signals written into the track memory 107 by using the error detection code (e.g., the Reed-Solomon iterated (product) code) to detect and correct errors.

Further, the error correction processing circuit 109 similarly implements error-correction encoding on the audio signals and the sub-code data which are recorded in the track memory 107.

The video signals and the like which are read from the track memory 107 are output to the signal processing circuit 113 for use in recording/reproducing. The signal processing circuit 113 adds the ID data, the synchronization signal and the like to the video signals which are error-correction encoded, and outputs them to the recording/reproducing circuit 115 by implementing the digital modulation process thereon. The recording/reproducing circuit 115 records the video signals modulated in the signal processing circuit 113 on magnetic tape by using a rotary head.

When the user issues a "reproducing" instruction by using the console panel 119, signals reproduced by the recording/reproducing circuit 115 are output to the signal processing circuit 113 for use in recording/reproducing. The signal processing circuit 113 demodulates the reproduced signals and detects the digital signals (including the video signals) which were previously recorded. Then, the signal processing circuit 113 detects the synchronization signals and the ID data from the digital signals, and writes them into the track memory 107 with the ID data.

The error correction processing circuit 109 accesses track memory 107, and corrects error(s) in the signals by implementing an error-correction decoding process on the video signals and the like which are written into the track memory 107, and interpolates signals which contain errors to correct those errors.

The video signals on which the error correction decoding process has been implemented are output to the compression/expansion circuit 105. The compression/expansion circuit 105 decodes the video signals, by implementing, on the video signals, the processes which are reverse to those used at the time of recording, and writes them into the video memory 103 by expanding the amount of information thereof. The video memory 103 reads the video signals in the order of the raster scan and then supplies them to the I/O circuit 101. The I/O circuit 101 implements an interpolation of the pixel and the like to the video signals read from the video memory 103, and converts them to the signals in a form suitable for displaying on the monitor 40, and outputs them to the monitor.

In the following, a transmission operation in the digital VTR 10 will be described.

In FIG. 1, 111 refers to the digital interface (DIF) in accordance with the IEEE 1394 standard, which is a standard for a high performance serial bus, and which can communicate with other devices connected through the transmission line 20 in either a synchronized or non-synchronized manner. Also, after having been packetized into predetermined formats, the compressed video signals supplied by the compression/encoding circuit 105, the audio signals supplied by the voice signal processing circuit 123, and the reproduced signals supplied by the signal processing circuit 113 are output by the DIF 111 to other devices.

Further, a case of transmitting the reproduced signals supplied by the signal processing circuit 113 will be described in detail in the present embodiment.

Figure 2:
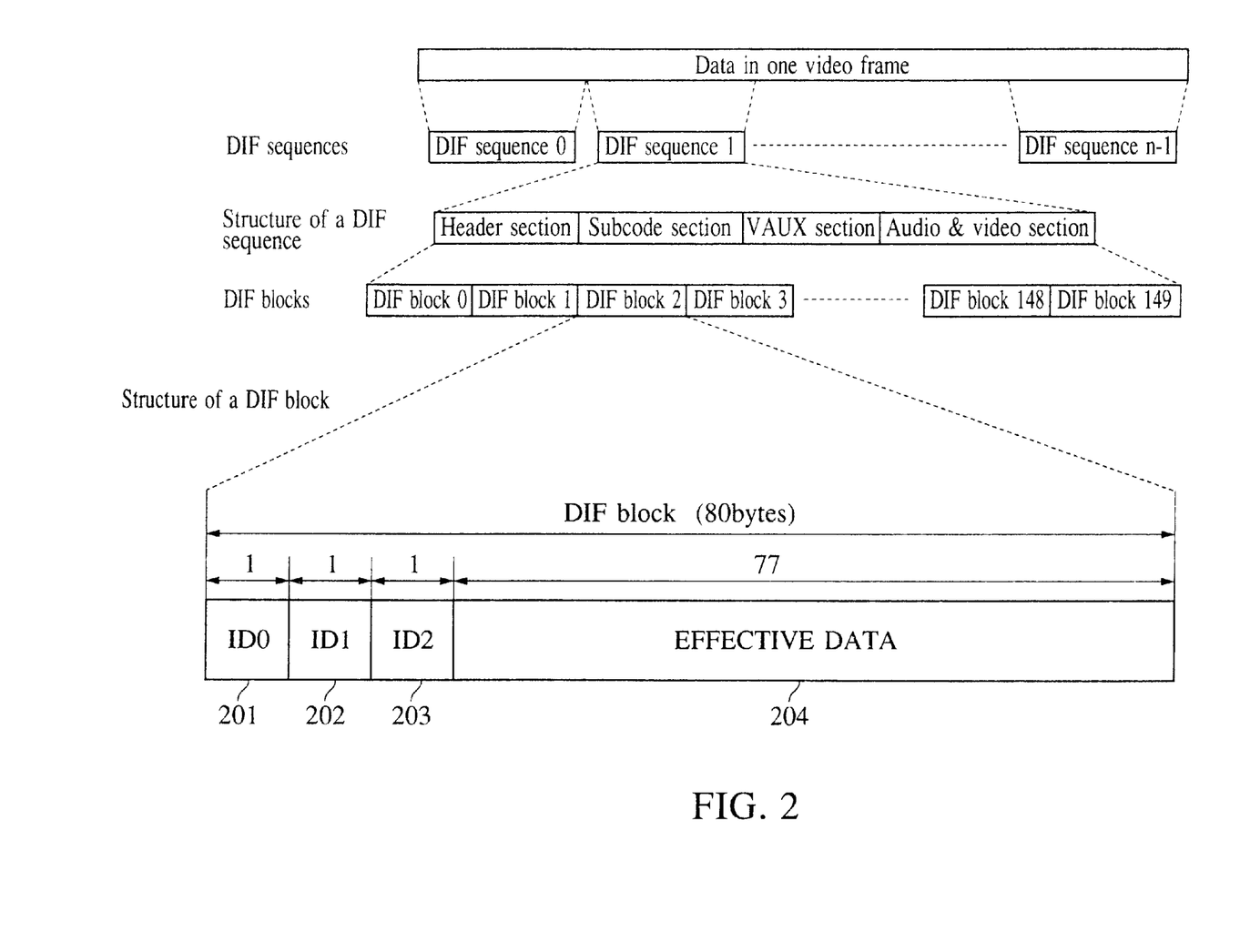
FIG. 2 is a diagram showing a configuration of the data of one block which is stored in the track memory 107 in one embodiment of the present invention.

FIG. 2 is a diagram showing a structural example of a data stored in the track memory 107 in the present embodiment.

In the present embodiment, data for one video frame shown in FIG. 2 is stored in each of the banks provided with the track memory 107. One video frame includes the video signals, the audio signals, the header data, the sub-code data, and the video AUX data for one frame.

In FIG. 2, 1 DIF block stored in the track memory 107 is constituted of 80 bytes in which ID data of 3 bytes is added to the effective data (204) of 77 bytes. Among the ID data of 3 bytes, the ID0 (201) indicates the type (any of the header, the sub-code, the video AUX, the audio, and the video) of effective data 204, the ID1 (202) indicates the track number of the reproduced signal which has been recorded (In the recording/reproducing circuit 114 of the digital VTR 10, the video signals of one frame are recorded into 10 tracks for the NTSC system, and 12 tracks for the PAL system. Accordingly, the track number of the present embodiment indicates into which track among 10 or 12 tracks the data was recorded). Further, the ID2 (203) indicates the block number.

In the present embodiment, the data for 1 video frame is constituted of 1 header block, 2 sub-code blocks, 3 video AUX blocks, 9 audio blocks, and 135 video blocks. Usually, at the time of transmitting, the track memory 107 sequentially outputs the data for 1 video frame to the DIF 111 6 blocks at a time (480 bytes). Then, the DIF 111 packetizes the 6 blocks into 1 packet (hereinafter referred to as the DIF data) and transmits the data to an external device.

Herein, the DIF 111 has 2 kinds of communication systems, i.e. an isochronous transfer system of which the transfer band is secured per a predetermined communication cycle period (125 $\mu$s), and an asynchronous transfer system of which a communication is made in an irregular timing as required. For example, the DIF data constituted of at least one of the above-mentioned header data, the sub-code data, the video AUX data, the video data and the audio data is packetized for use by isochronous transfer, and is serial-transferred to the digital interface of other devices continuously with an approximately constant data rate. Also, the control data such as the control command is packetized for asynchronous transfer, and serially-transferred.

Figure 3:
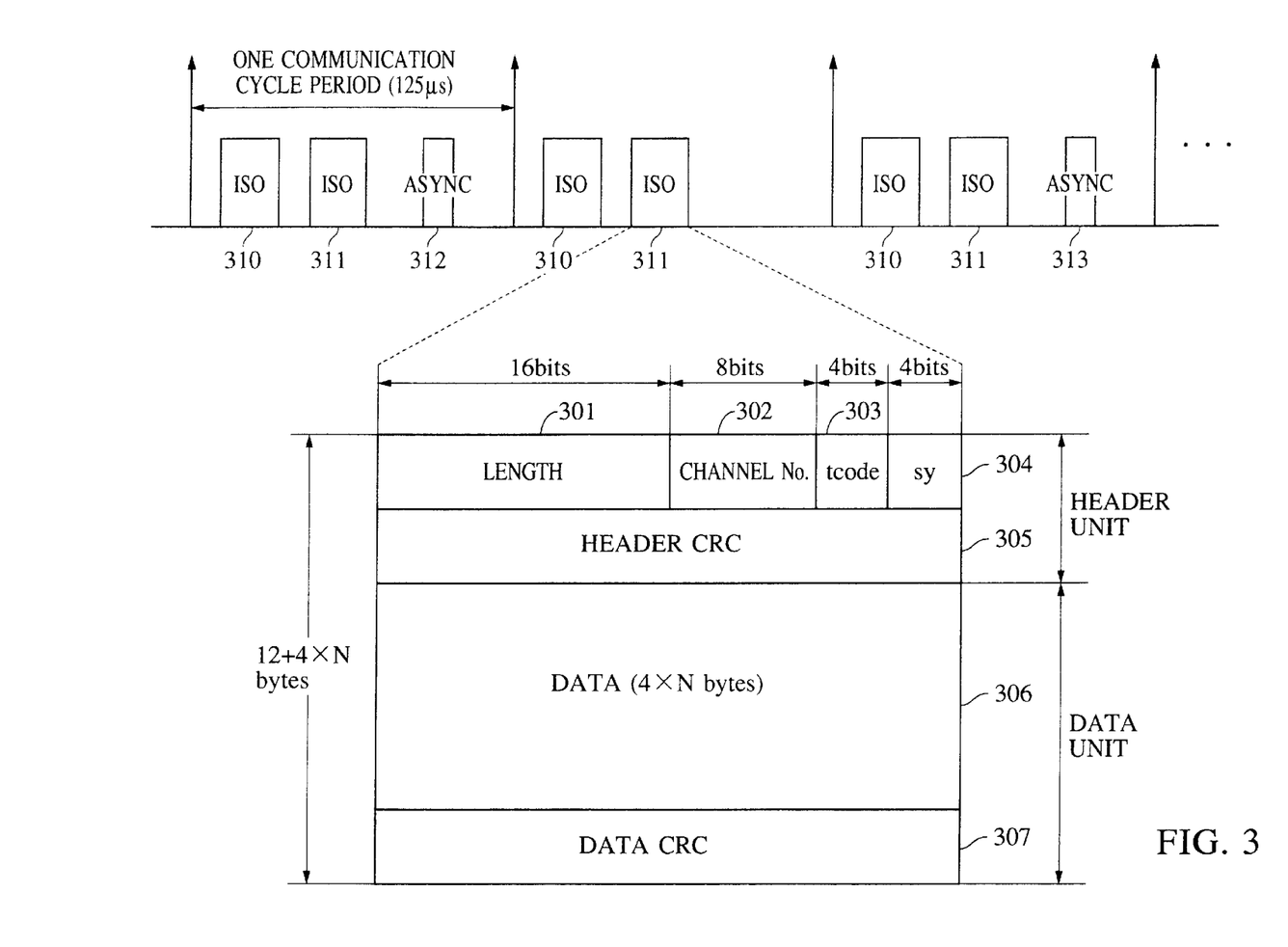
FIG. 3 is a diagram showing a configuration of a packet to be isochronous transferred through the DIF 111 in one embodiment of the present invention.

FIG. 3 is a diagram showing a structural example of a packet for isochronous (synchronized) transfer in the present embodiment. Further, the isochronous packet data in the present embodiment is 12+4×N bytes long.

In FIG. 3, 301 refers to a length-field and defines a byte-length of the data field following the header units (301~305). 302 refers to a field indicating a channel number for use in an isochronous transfer, and provides a logical number for the isochronous transfer by using the digital signal of 8 bits. On the receiving side, a required isochronous transfer data is evaluated with reference to this channel number. 303 refers to a code field, and when this packet is a packet for use in the isochronous transfer, a value indicating such is inserted. 304 refers to a sy-field, and is used for exchanging a synchronized information between a source and a destination thereof, and is utilized by application software. 305 refers to a header CRC field, and is a code for use in error detection of fields 301~304. 306 refers to a data-field, and stores the DIF data for 6 blocks. 307 refers to a data CRC, and is a code for use in error detection for the data field 306.

Further, in FIG. 3, 310, 311 refer to packets based on the isochronous transfer system, 312, 313 refer to packets based on the asynchronous transfer system. During 1 communication cycle period (12 $\mu$s), each packet can be intermingled, and transferred in a time-sharing manner.

In the following, a case will be described in which the DIF 111 receives the DIF data which has been isochronously transferred from an external digital interface.

The DIF 111 receives the packets which has been isochronously transferred through the transmission line 20 one after another, and takes out the DIF data included in each packet by using a packet header, and then writes it into the track memory 107. Herein, if it is the case that the VTR 10 is in a recording state (e.g., during a digital dubbing process), then the above described recording process is implemented by reading the data for 1 video frame constituted of a plurality of the DIF data written into the track memory 107. Further, if it is in a reproducing state, then the video signals constituted of a plurality of the DIF data received from an outside device are decoded by using the compression/expansion circuit 105, and displayed on the monitor 40.

Figure 4:
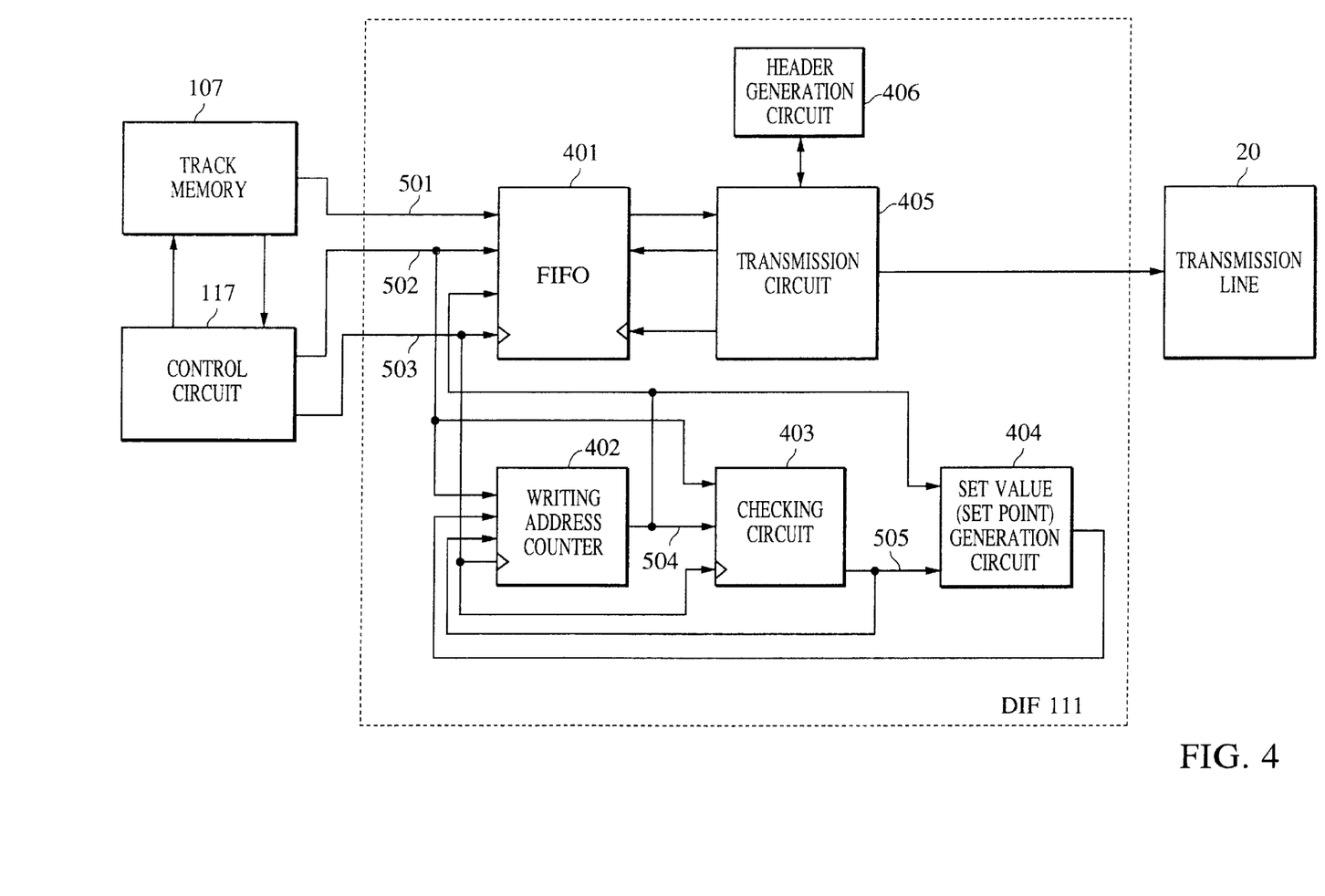
FIG. 4 is a block diagram showing a configuration of a part of the DIF 111 (transmitting side)
Figure 5:
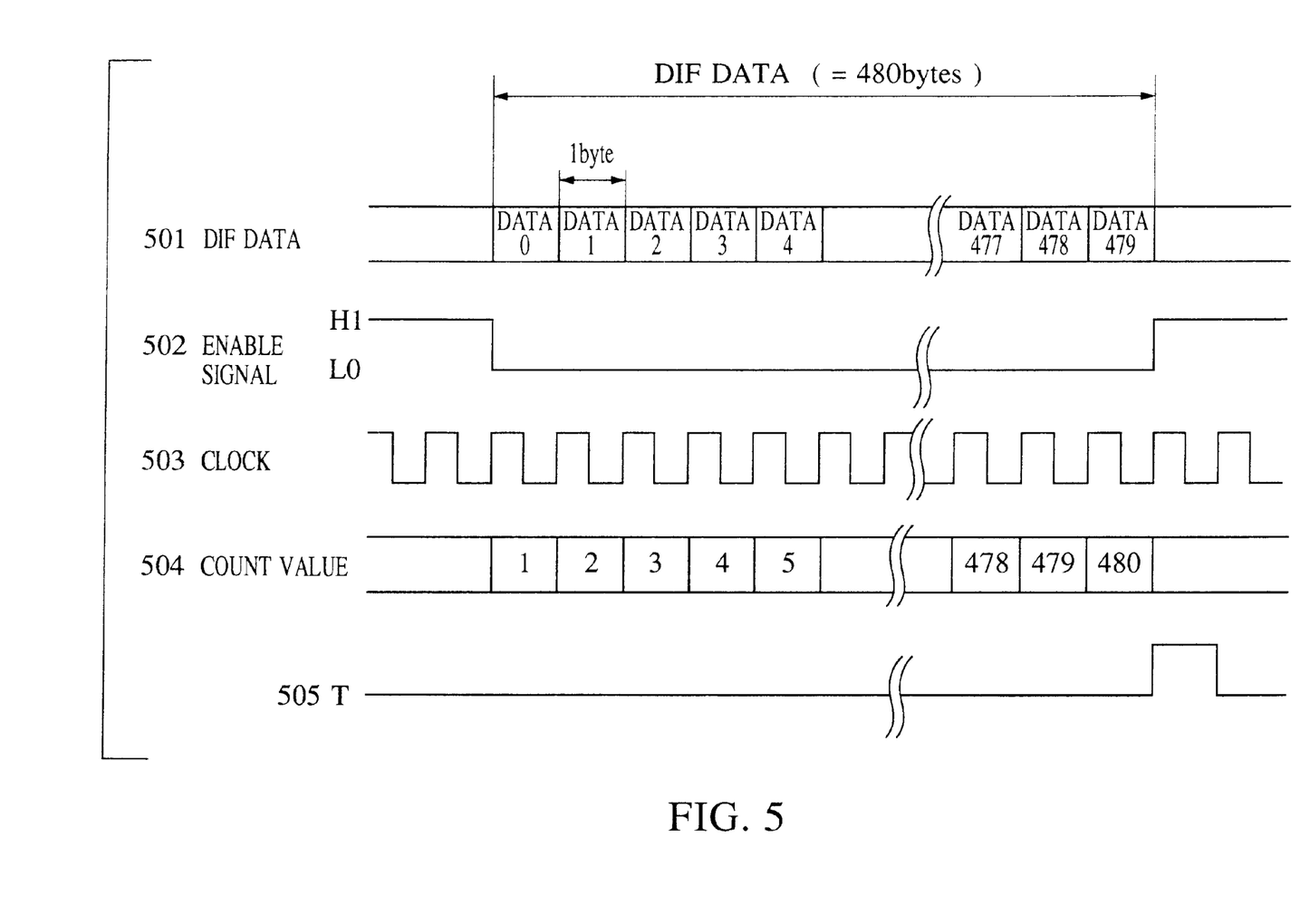
FIG. 5 is a timing chart showing the timings of the DIF data, the write enable signal, and the clock.

FIG. 4 is a block diagram showing the configuration (on transmitting side) of a portion of the DIF 111 in the present embodiment. In the present embodiment, a process of isochronous transferring to an outside device by temporarily storing the DIF data output from the track memory 107 into the memory 401 provided with the DIF 111 will be described using FIGS. 4–8.

In FIG. 4, 401 refers to a FIFO memory capable of storing the DIF data (in the present embodiment, the DIF data for 1 packet is constituted of 6 DIF blocks, and 480 bytes) for N packets (N is an integer equal to or greater than 1), and for example, is implemented with 2-port RAM. 402 refers to a writing address counter for counting a writing address of the FIFO memory 401, and increments the count value each time the DIF data for 1 byte is written into the FIFO memory 401. 403 refers to a checking circuit for checking whether or not the DIF data for 1 packet is written during a writing period indicated by a write enable signal (output from the control circuit 117). 404 refers to a set value generation circuit for generating a predetermined preset value from the count value of the writing address counter 402 and the output of the checking circuit 403. 405 refers to a transmission circuit for outputting each isochronous packet to an allocated transfer band per a predetermined communication cycle, by packetizing the DIF data read from the FIFO memory 401 to a packet for use in the isochronous transfer. 406 refers to a header generation circuit for generating a header for the packet output from the transmission circuit 405.

Figure 7:
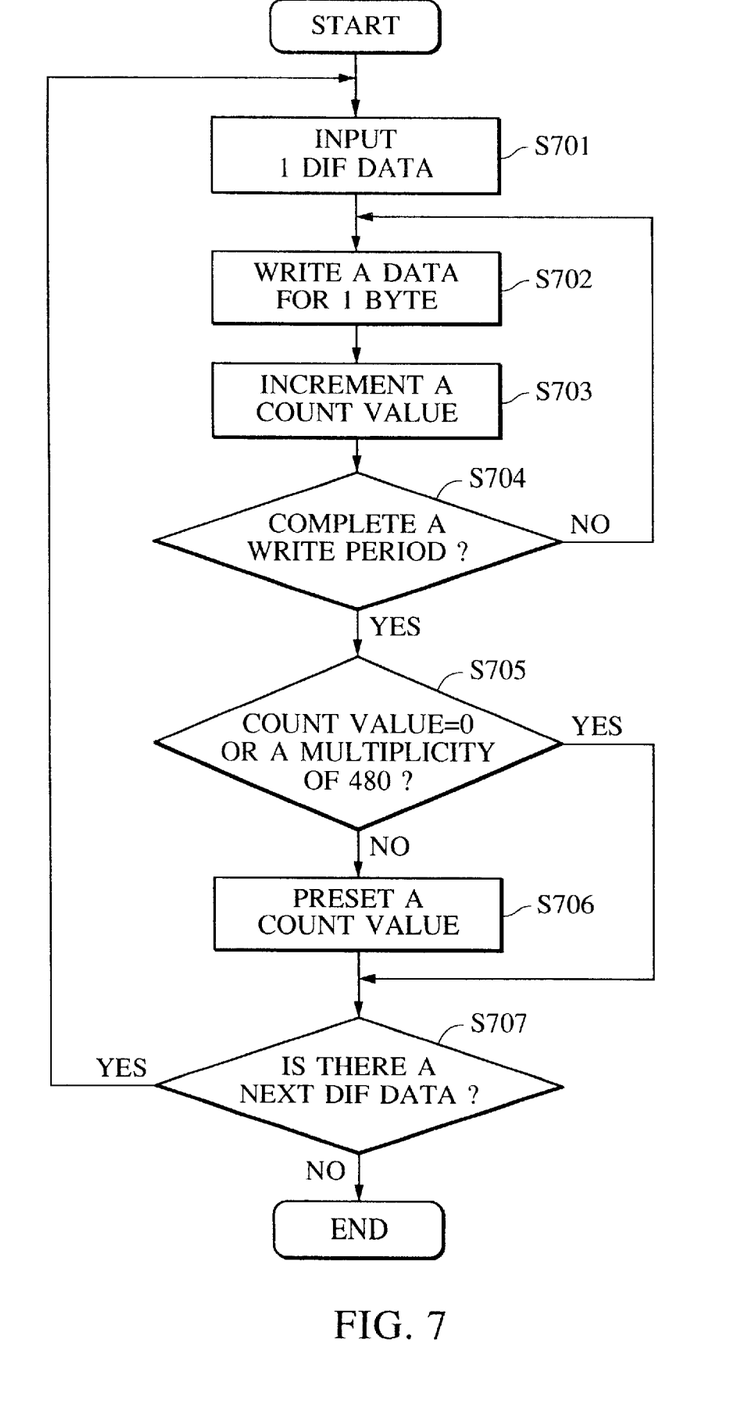
FIG. 7 is a flow chart illustrating a writing operation in the memory 401 provided in the DIF 111.

In FIG. 4, the DIF data 501 for 1 packet supplied to the DIF 111 from the track memory 107 is input into the FIFO memory 401 (step S701 in FIG. 7). Further, the clock 503 and the write enable signal 502 supplied from the control circuit 117 to the DIF 111 are provided to the FIFO memory 401, the write address counter 402 and the checking circuit 403.

The FIFO memory 401 writes one byte of DIF data 501 output from the track memory 107 in accordance with each clock cycle when the write enable signal 502 turns LO (step S702 in FIG. 7). Further, the FIFO memory 401 of the present embodiment has the capacity to store 2 packets of DIF data (960 bytes).

The write address counter 402 sets the count value to 1 when the write enable signal 502 turns LO and the DIF data inputted into the FIFO memory 401 is written into address 0 (step S703 in FIG. 7). Then, the count value is incremented as each byte of DIF data is written into the FIFO memory 401, and a value thereof is supplied to the FIFO memory 401 as an address to be written at the next write operation. As a result, the write address counter 402 can detect the DIF data quantity written into the FIFO memory 401, and can indicate a next write address. The count value (504) of the write count 402 is also provided to the checking circuit 403 and the set value generation circuit 404.

The checking circuit 403 checks whether or not the DIF data for 1 packet has been written during the period of time indicated by the write enable signal 502 (step S704 in FIG. 7).

Figure 6:
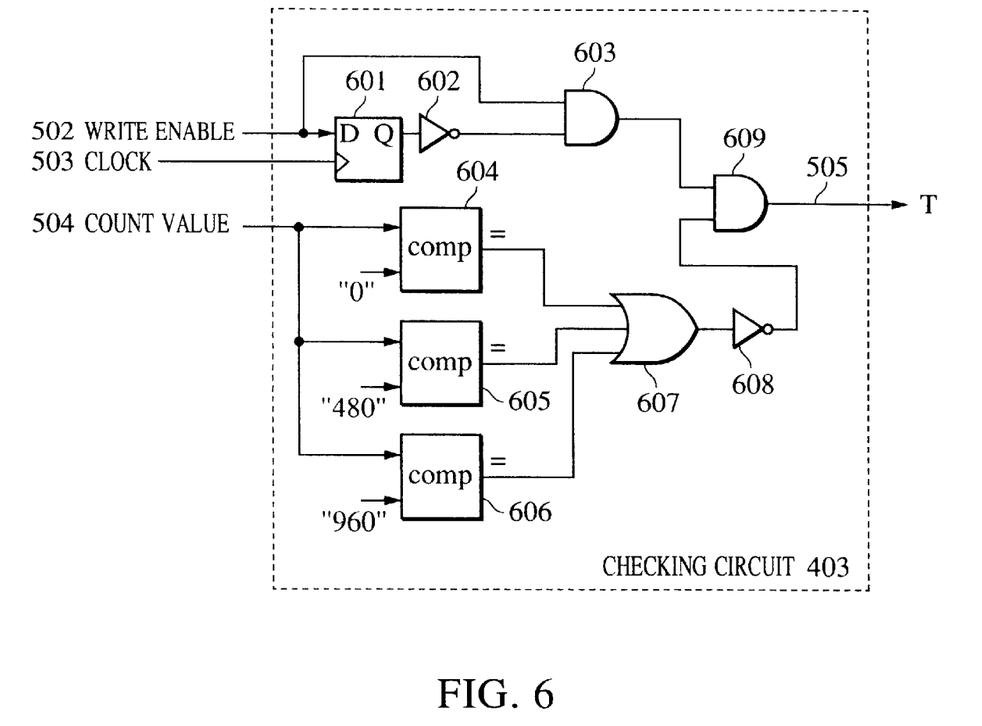
FIG. 6 is a block diagram showing a configuration of the detection circuit 403 in one embodiment of the present invention.

In the following, a structural example of the checking circuit 403 in the embodiment of the present invention is shown in FIG. 6, and the operation thereof will be described.

In FIG. 6, the clock 503 and the write enable signal 502 outputted from the control circuit 117 are input into the register 601. The output of the register 601 is inverted by the inverter 602, and then is input into the AND gate 603. The AND gate 603 takes the logical product (AND) of the write enable signal 502 output from the control circuit 117 with the output of the inverter 602. As a result, the AND gate 603 can detect the timing of a rise (leading edge) of the write enable signal 502. This timing is shown as T 505 in FIGS. 5 and 6.

On the other hand, the count value 504 output from the write address counter 402 is compared by the comparison means 604 as to whether or not it is "0". As a result of this comparison, the comparison circuit 604 outputs to the OR gate 605 in the post stage, a HI if they are matched, and a LO if they are not matched. Further, the comparison circuits 605 and 606 also similarly compare the count value 504 output from the write address counter 402 with "480" and "960", and output a comparison result (a HI if they are matched, and a LO if they are not matched) thereof to the OR gate 607 in the post stage. As a result, the output of the OR gate 607 turns HI when the count value input to the checking circuit 403 is either 0, 480 or 960, and turns LO when the count value is any other value.

The output of the OR gate 607 is inverted through the inverter 608, and then is input into the AND gate 609. The AND gate 609 takes a logical product (AND) of the output of the AND gate 603 with the output of the inverter 608. That is, the AND gate 609 checks the count value at the time of a rise (leading edge) of the write enable signal 502, and outputs a LO if the count value 504 thereof is matched with either 0, 480 or 960, and a HI if the count value is not matched with them (step S705 in FIG. 7). The output of the AND gate 609 is provided as T 505 to the set value generation circuit 404 and the write address counter 402 as a checking result by the checking circuit 403.

Accordingly, the checking circuit 403 can check whether or not 1 DIF data (480 bytes) has been written during the period of time indicated by the write enable signal 502. Further, the checking result provided to the checking circuit 403 is supplied to the write address counter 402 as a preset enable signal which presets an output value of the set value generation circuit 404.

The set value generation circuit 404 generates a predetermined preset value from the count value of the write address counter 402 and the output of the checking circuit 403, and supplies the result thereof to the write address counter 402.

Figure 8:
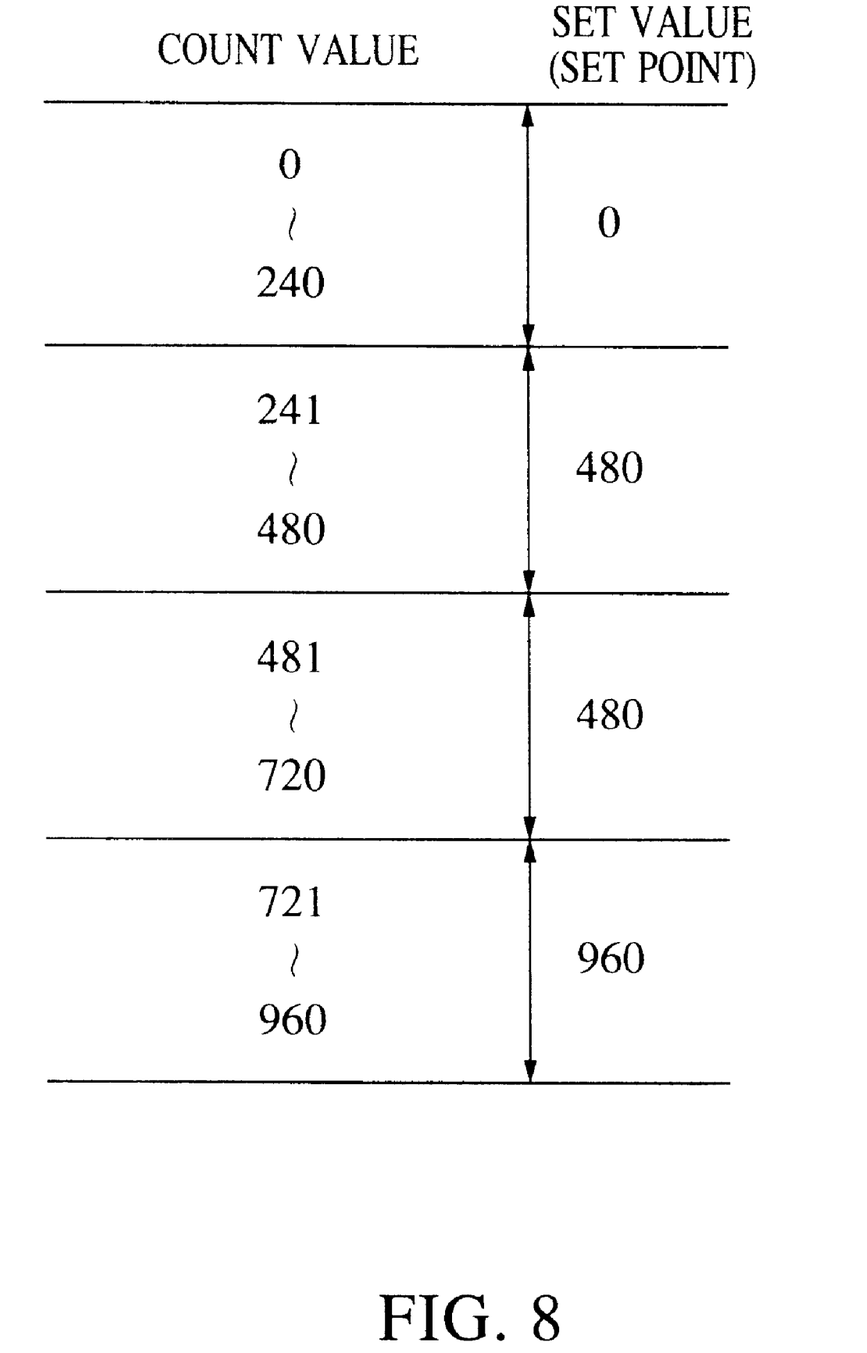
FIG. 8 is a diagram showing the correspondence of the count values in the address count 402 with the preset values which are generated in accordance with the count values.

FIG. 8 is a diagram showing the correspondence of the count value of the write address counter 402 to the preset value generated according to the count value.

In FIG. 8, the set value generation circuit 404 outputs a preset value which has been preset to the write address counter 402 when the output of the checking circuit 403 is HI (i.e., when the count value 504 is neither of 0, 480, or 960 at a time of the rise of the write enable signal 502) (step S706 in FIG. 7). For example, "0" is output when the input count value is 0~240, "480" is output when it is 241~720, and "960" is output when it is 721~960. As a result, the count .value of the write address counter 402 is preset to a set value generated by the set value generation circuit 404. Accordingly, a write address of the DIF data to be written into the FIFO memory 401 at the next time can be revised to either 0 or a multiple of 480.

The DIF data for N packets written into the FIFO memory 401 is read packet by packet (per 480 bytes, in the present embodiment) in accordance with a reading request of the transmission circuit 405. The transmission circuit 405 generates an isochronous packet from the header information for use in the isochronous packet generated in the header generation circuit 406, the DIF data for 1 packet and the CRC for use in error detection, and outputs each isochronous packet to an allocated transfer band per a predetermined communication cycle.

As described above, even when writing of the DIF data for 1 packet output from the track memory 107 has occurred normally, the missing data is minimized, and the DIF data for the next packet can be written normally (step S707 in FIG. 7).

Figure 9:
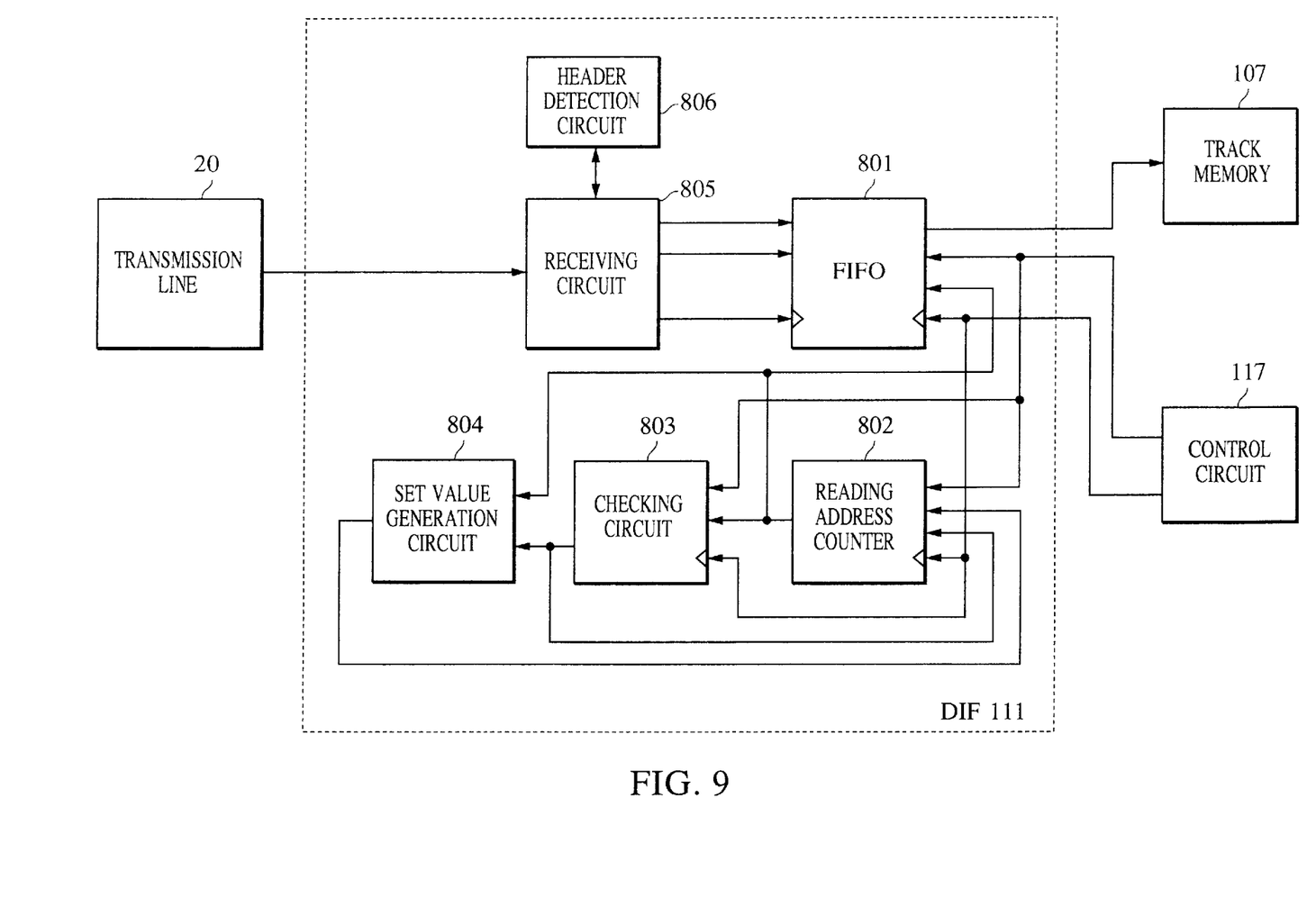
FIG. 9 is a block diagram showing a configuration of a part of the DIF111 (receiving side)

In the following, an operation of reading the DIF data for N packets written into the FIFO memory 401 will be described with reference to FIGS. 9 and 10. FIG. 9 is a block diagram showing the configuration (on the receiving side) of a portion of the DIF 111 in the present embodiment.

In FIG. 9, 801 refers to a FIFO memory, similar to the FIFO memory 401 shown in FIG. 4, capable of storing the DIF data for N packets. 802 refers to a reading address counter which counts the read address of the FIFO memory 801, and increments the count value as the DIF data for 1 byte is read from the FIFO memory 801. 803 refers to a checking circuit for checking whether or not the DIF data for 1 packet has been read during a read period of time indicated by the read enable signal (output from the control circuit 117). 804 refers to a set value generation circuit for generating a predetermined preset value from the count value of the read address counter 802 and the output of the checking circuit 803. 805 refers to a receiving circuit for receiving an isochronous packet transferred through the transmission line 20, and for writing the DIF data included in the packet into the FIFO memory 801. 806 refers to a header detection circuit for detecting the header of the packet received in the receiving circuit 805.

The receiving circuit 805 receives a packet isochronously transferred per a predetermined communication cycle through the transmission line 20 one after another, and detects the header information of each packet in the header detection circuit 806. After having detected the header information, the receiving circuit 805 outputs the DIF data (480 bytes in the present embodiment) included in each packet to the FIFO memory 401 one after another. The FIFO memory 801 writes the DIF data input packet by packet one after another, and then stores them (step S1001 in FIG. 10). Further, the FIFO memory 801 in the present embodiment has the capacity two packets of DIF data (960 bytes).

Figure 10:
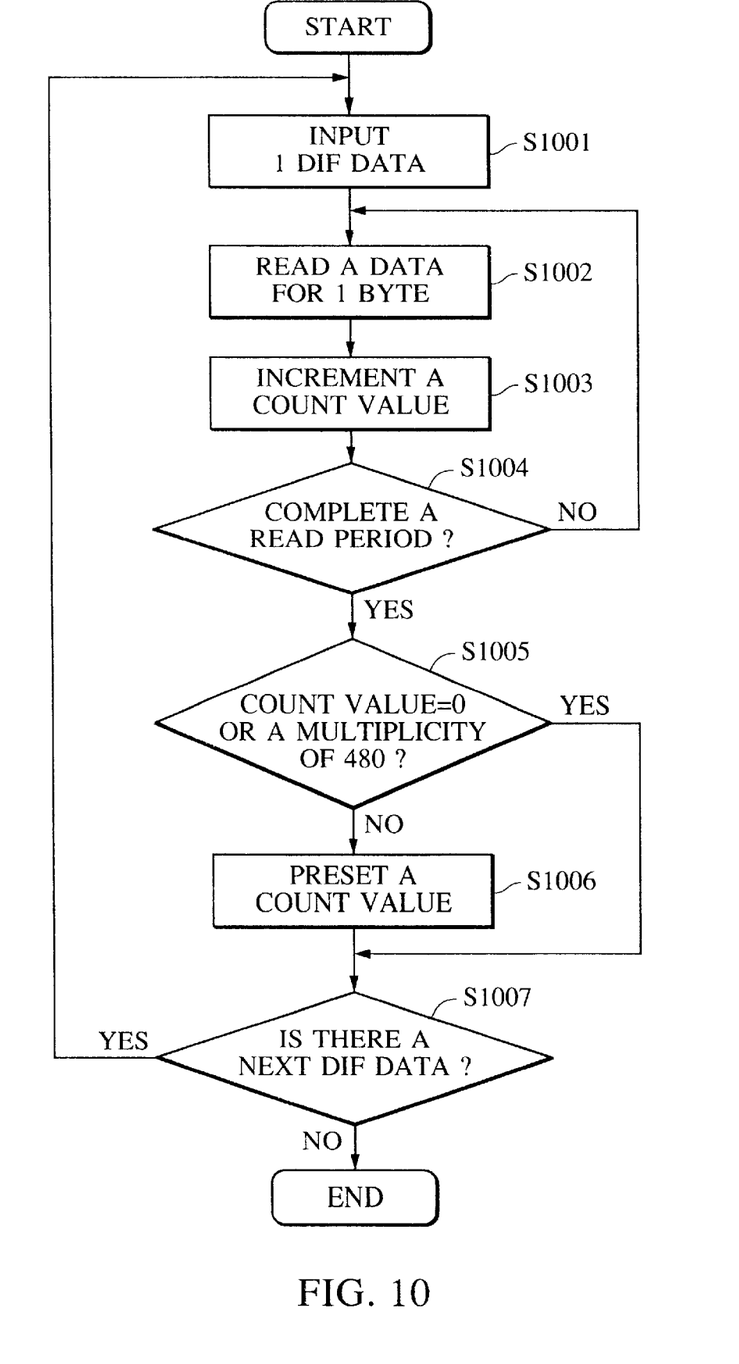
FIG. 10 is a flow chart illustrating a reading operation in the memory 801 provided in the DIF 111.

DIF data stored in the FIFO memory 801 is read byte by byte each time a read enable signal output from the control circuit 117 turns LO, according to a clock which is similarly output from the control circuit 117 (step S1002 in FIG. 10). The DIF data read from the FIFO memory 801 is supplied to the track memory 107, and then stored.

The read address counter 802 sets the count value to 1 when the read enable signal turns LO, and the DIF data stored in the FIFO memory 801 is read from the address 0 (step S1003 in FIG. 10). Then the count value is incremented as each byte of DIF data is read from the FIFO memory 801, and the value thereof is supplied to the FIFO memory 801 in order to indicate an address to be read at the next read time. As a result, the reading address counter 802 can detect the DIF data quantity read from the FIFO memory 801, and indicate an address to be read at the next read time. The count value of the read address counter 802 is also supplied to the checking circuit 803 and the set value generation circuit 804.

The checking circuit 803 checks whether or not the DIF data for 1 packet has been read during the period of time indicated by the read enable signal (outputted from the control circuit 117) (step S1004 in FIG. 10). That is, the checking circuit 803 checks whether or not the count value of the read address counter 802 is either 0, 480, or 960, at the time of a rise of the read enable signal, and outputs a HI to the set value generation circuit 804 when they are not matched (step S1005 in FIG. 10).

The set value generation circuit 804 generates a predetermined preset value from the count value of the read address count 802 and the output of the checking circuit 803, and supplies the result thereof to the read address counter 802. That is, the set value generation circuit 804 outputs "0" when an output of the checking circuit 803 is a HI, and the output count value from the read count 802 is 0~240. Further, the set value generation circuit 804 outputs "480" when the output of the checking circuit 803 is HI, and the count value is 241~720, and outputs "960" when the output of the checking circuit 803 is HI, and the count value is 721~960. As a result, the count value of the read address counter 802 is preset to a set value generated by the set value generation circuit 804 (step S1006 in FIG. 10). Accordingly, a read address of the DIF data to be read from the FIFO memory 801 at the next read time can be revised to either 0 or a multiple of 480.

As described above, even when a reading of the DIF data for 1 packet stored in the FIFO memory 801 has not occurred normally, the missing data is minimized, and the DIF data for the next packet can be read normally (step S1007 in FIG. 10).

As described above in the present embodiment, during a period of time when the write enable signal indicates a writing to the FIFO memory 401, each byte of DIF data written into the FIFO memory 401 is counted. Then, the count value is checked at the time of a rise of the write enable signal, and a write address is preset to a set value according to the count value when a checking result is not a predetermined value. As a result, the missing data is minimized, and an interruption of the isochronous communication can be prevented even when a spike is generated in the enable signal and/or in the clock by noise, caused, for example, by static electricity.

Further, in the present embodiment, during the period of time when the read enable signal indicates a reading from the FIFO memory 401, each byte of DIF data read from the FIFO memory 401 is counted. Then, the count value is checked at the time of a rise of the read enable signal, and a read address is preset to a set value according to the count value when a checking result is not a predetermined value. As a result, the missing data is minimized, and an interruption of the isochronous communication can be prevented even when a spike is generated in the enable signal and/or in the clock by noise, caused, for example, by static electricity.

Another Embodiment

The above described embodiment can also be implemented as follows.

For instance, it might be constituted that the recording medium 125 into which the program codes of a software implementing the functions of the above described embodiment are recorded is provided to the control circuit 117 (including the microcomputer) provided with the digital VTR 10 of the above described embodiment.

Then, the above described embodiment can be implemented such that the control circuit 117 provided with the digital VTR 10 of the above described embodiment reads the program codes stored in the recording medium 125, and controls operation of the DIF 111 so as to implement the functions of the above described embodiment.

For example, the recording medium 125 stores the program codes for implementing the processes and functions shown in FIGS. 7 and 10 in the above described embodiment, and provides them to the control circuit 117 shown in FIG. 1. Then, the respective processing circuits of the DIF 111 shown in FIG. 1 might be operated in such a manner that the control circuit 117 implements the functions of the above described embodiment by reading the program codes stored in the recording medium 125.

In this case, as the program codes themselves which are read from the recording medium 125 implement the functions of the above described embodiment, and the recording medium 125 which stores the program codes becomes one of the components of the present invention.

The recording medium 125 providing the program codes can be, for example, a floppy disk, a hard disk, an optical disk, an magneto-optical disk, a CD-ROM, a CD-R, a magnetic tape, a non-volatile memory card, or a ROM.

Further, the program codes of the software implementing the functions of the above described embodiment can be pre-recorded into the recording medium 125 in advance, or recorded into the recording medium 125 after being received from an outside device through the DIF 111 or the Input/Output (I/O) circuit 101.

The functions of the above described embodiment can also be implemented as the OS (Operating System) or an application software and the like which is running on the control circuit 117, controlling the operation of the DIF 111 in the above described embodiment based on the program codes read from the recording medium 125.

The functions of the above described embodiment can also be implemented in a control unit provided with a feature expansion board or a feature expansion unit itself to control the operation of the DIF 111 in the above described embodiment based on the indications of the program codes, after the program codes read from the recording medium 125 have been written into the memory provided with the feature expansion board or the feature expansion unit connected to the control circuit.

Further, the present invention can be implemented in various other forms without departing from the spirit and the main features thereof.

For example, in the present embodiment, although the processes for the time when writing the DIF data for 1 packet input from the track memory 107 into the FIFO memory 401 and the time when reading the DIF data stored in the FIFO memory 401 1 packet at a time and outputting them to the track memory 107 are described, processes similar to these described embodiments can be implemented when reading the DIF data stored in the FIFO memory 401 1 packet at a time and outputting them to the transmission circuit 405, and when writing the DIF data received in the receiving circuit 804 1 packet at a time into the FIFO memory. Therefore, the above-described embodiments are only examples in all respects and thus the present invention is not intended to be limited to the above described embodiments.

What is claimed is:

1. A device for controlling a memory to write fixed-length data packets, comprising:
   counting means for counting a quantity of data for a first fixed-length data packet being written into the memory;
   comparing means for comparing the counted quantity of the data with a first predetermined value; and
   addressing controlling means for revising a value of a write address for writing a second fixed-length data packet into the memory, writing of the second fixed-length data packet following that of the first fixed-length data packet, the value of the write address being revised to a second predetermined value based on a result of the comparing means.

2. A device according to claim 1, wherein said counting means counts the data quantity written to the memory during a predetermined period of time.

3. A device according to claim 2, wherein said memory sequentially writes a fixed-length quantity of data.

4. A device according to claim 2, wherein the predetermined period of time is controlled by an enable signal supplied from an outside device.

5. A device according to claim 1, wherein the first predetermined value and the second predetermined value each is a value representing an integer multiple of a quantity of data of the fixed-length data packets.

6. A device according to claim 1, wherein said address controlling means presets the writing position of the second fixed-length data packet to a predetermined position, based on a comparison result of said comparing means.

7. A device according to claim 1, wherein the fixed-length data packets include digital video data and digital audio data.

8. A device according to claim 1, wherein the device further comprises a digital interface in accordance with IEEE 1394.

9. A device according to claim 1, further comprising a digital VTR which isochronously transfers the fixed-length data packets.

10. A receiver, comprising:
    receiving means for receiving fixed-length data packets and writing the fixed-length data packets into a memory;
    counting means for counting a quantity of data for a first fixed-length data packet being written into the memory;
    comparing means for comparing the counted quantity of the data with a first predetermined value; and
    address controlling means for revising a value of a write address for writing a second fixed-length data packet into the memory, writing of the second fixed-length data packet following that of the first fixed-length data packet, the value of the write address being revised to a second predetermined value based on a result of the comparing means.

11. A receiver according to claim 10, wherein the first predetermined value and the second predetermined value each is a value representing an integer multiple of a quantity of data of the fixed-length data packets.

12. A receiver according to claim 10, wherein the receiving means receives each of the fixed-length data packets in a predetermined communication style.

13. A receiver according to claim 10, wherein the receiving means operates in accordance with the IEEE 1394.

14. A receiver according to claim 10, wherein the receiver is comprised of a digital video recorder.

15. A transmitter for transmitting fixed-length data packets, comprising:
    counting means for counting a quantity of data for a first fixed-length data packet being read from a memory;
    comparing means for comparing the counted quantity of the data with a first predetermined value;
    address controlling means for revising a value of a read address for reading a second fixed-length data packet from the memory, reading of the second fixed-length data packet following that of the first fixed-length data packet, the value of the read address being revised to a second predetermined value based on a result of the comparing means; and transmitting means for transmitting the fixed-length data packets read from the memory.

16. A transmitter according to claim 15, wherein the first predetermined value and the second predetermined value each is a value representing an integer multiple of a quantity of data of the fixed-length data packets.

17. A transmitter according to claim 15, wherein the transmitting means transmits each of the fixed-length data packets in a predetermined communication cycle.

18. A transmitter according to claim 15, wherein the transmitting means operates in accordance with IEEE 1394.

19. A transmitter according to claim 15, wherein the transmitter is comprised of a digital video recorder.

20. A method of controlling a memory to write fixed-length data packets, comprising:

a counting step of counting a quantity of data for a first fixed-length data packet being written into the memory;

a comparing step of comparing the counted quantity of the data with a first predetermined value; and an address controlling step of revising a value of a write address for writing a second fixed-length data packet into the memory, writing of the second fixed-length data packet following that of the first fixed-length data packet, to a second predetermined value based on a result of the comparing step.

21. A method according to claim 20, wherein the first predetermined value and the second predetermined value each is a value representing an integer multiple of a quantity of data of the fixed-length data packets.

22. A method according to claim 20, further comprising the step of accessing the memory via a digital interface in accordance with IEEE 1394.

23. A method of controlling a receiver, comprising:

a receiving step of receiving packets corresponding to fixed-length data packets and writing the fixed-length data packets into a memory;

a counting step of counting a quantity of data for a first fixed-length data packet being written into the memory;

a comparing step of comparing the counted quantity of the data with a first predetermined value; and an address controlling step of revising a value of a write address for writing a second fixed-length data packet into the memory, writing of the second fixed-length data packet following that of the first fixed-length data packet, the value of the write address being revised to a second predetermined value based on a result of the comparing step.

24. A method according to claim 23, wherein the first predetermined value and the second predetermined value each is a value representing an integer multiple of a quantity of data of the fixed-length data packets.

25. A method according to claim 23, wherein the receiving step receives each of the packets in a predetermined communication cycle.

26. A method according to claim 23, wherein the receiving step operates in accordance with IEEE 1394.

27. A method according to claim 23, wherein the receiver is comprised of a digital video recorder.

28. A method of controlling a transmitter which transmits fixed-length data packets, comprising:

a counting step of counting a quantity of data for a first fixed-length data packet being read from a memory;

a comparing step of comparing the counted quantity of the data with a first predetermined value;

an address controlling step of revising a value of a read address for reading a second fixed-length data packet from the memory, reading of the second fixed-length data packet following that of the first fixed-length data packet, the value of the read address being revised to a second predetermined value based on the results of the comparing step; and a transmitting step of transmitting the fixed-length data packets read from memory.

29. A method according to claim 28, wherein the first predetermined value and the second predetermined value each is a value representing an integer multiple of a quantity of data of the fixed-length data packets.

30. A method according to claim 28, wherein the transmitting step transmits each of the fixed-length data packets in a predetermined communication style.

31. A method according to claim 28, wherein the transmitting step operates in accordance with IEEE 1394.

32. A method according to claim 28, wherein the transmitter is comprised of a digital video recorder.

33. A device for controlling a memory to read fixed-length data packets, comprising:

counting means for counting a quantity of data for a first fixed-length data packet being read from the memory;

comparing means for comparing the counted quantity of the data with a first predetermined value; and address controlling means for revising a value of a read address for reading a second fixed-length data packet from the memory, reading of the second fixed-length data packet following that of the first fixed-length data packet, the value of the read address being revised to a second predetermined value based on a result of the comparing means.

34. A device according to claim 33, wherein the first predetermined value and the second predetermined value each is a value representing an integer multiple of a quantity of data of the fixed-length data packets.

35. A device according to claim 33, wherein the fixed-length data packets include digital video data and digital audio data.

36. A device according to claim 33, wherein the device further comprises an interface in accordance with IEEE 1394.

37. A method of controlling a memory to read fixed-length data packets, comprising:

a counting step of counting a quantity of data for a first fixed-length data packet being read from the memory;

a comparing step of comparing the counted quantity of data with a first predetermined value; and an address controlling step of revising a value of a read address for reading a second fixed-length data packet from the memory, reading of the second fixed-length data packet following that of the first fixed-length data packet, the value of the read address being revised to a second predetermined value based on a result of the comparing step.

38. A method according to claim 37, wherein the first predetermined value and the second predetermined value each is a value representing an integer multiple of a quantity of data of the fixed-length data packets.

39. A method according to claim 37, further comprising the step of accessing the memory via a digital interface in accordance with the IEEE 1394.

* * * * *

UNITED STATES PATENT AND TRADEMARK OFFICE
CERTIFICATE OF CORRECTION

PATENT NO. : 6,289,427 B1
DATED : September 11, 2001
INVENTOR(S) : Tanaka

It is certified that error appears in the above-identified patent and that said Letters Patent is hereby corrected as shown below:

Column 6,
Line 6, "has" should read -- have --.

Column 7,
Line 4, "above described" should read -- above-described --.

Column 8,
Line 63, ".value" should read -- value --.

Column 9,
Line 48, "capacity" should read -- capacity for --.

Column 10,
Lines 57, 61, 64, 65 and 67, "above described" should read -- above-described --.

Column 11,
Lines 3, 6, 10, 14, 22, 27, 31, 33, 37 and 58, "above described" should read -- above-described --.

Signed and Sealed this

Twenty-sixth Day of March, 2002

Attest:

*Attesting Officer*

JAMES E. ROGAN
*Director of the United States Patent and Trademark Office*